United States Patent
Skogward et al.

(10) Patent No.: US 9,476,500 B2
(45) Date of Patent: Oct. 25, 2016

(54) MANUAL GEAR SHIFTER ASSEMBLY

(71) Applicants: Kongsberg Automotive AB, Mullsjo (SE); Kongsberg Driveline Systems I, Inc., Novi, MI (US)

(72) Inventors: Kenneth Skogward, Huskvarna (SE); Sofie Rydell Wigren, Jonkoping (SE); Russell Staniek, Canton, MI (US); Jeff Behounek, Macomb, MI (US); Jonathan Warner Love, Waterford, MI (US)

(73) Assignee: KONGSBERG DRIVELINE SYSTEMS I, INC, Novi, MI (US)

( * ) Notice: Subject to any disclaimer, the term of this patent is extended or adjusted under 35 U.S.C. 154(b) by 0 days.

(21) Appl. No.: 14/339,690

(22) Filed: Jul. 24, 2014

(65) Prior Publication Data

US 2015/0090061 A1    Apr. 2, 2015

Related U.S. Application Data

(60) Provisional application No. 61/884,381, filed on Sep. 30, 2013.

(51) Int. Cl.
*F16H 59/04* (2006.01)
*F16H 61/22* (2006.01)

(52) U.S. Cl.
CPC .............. *F16H 59/04* (2013.01); *F16H 61/22* (2013.01); *F16H 2061/223* (2013.01); *Y10T 74/20049* (2015.01)

(58) Field of Classification Search
CPC ........... F16H 2059/0282; F16H 61/22; F16H 61/18; F16H 61/16; F16H 2061/223; F16H 2061/185; F16H 2061/166; F16H 59/04; F16H 63/3475; B60R 25/02144; Y10T 70/5934; Y10T 74/20049; Y10T 74/20085; Y10T 74/20091; Y10T 74/20104; Y10T 74/20098
USPC .............. 74/473.21, 473.15, 473.12, 473.22, 74/473.23, 473.24, 473.27, 473.28, 483 R; 192/220.2, 220.4; 70/247, 248
See application file for complete search history.

(56) References Cited

U.S. PATENT DOCUMENTS

| | | |
|---|---|---|
| 3,942,614 A | 3/1976 | Thompson |
| 4,141,258 A | 2/1979 | Walzer |
| 4,693,135 A * | 9/1987 | LaRocca ................. F16H 59/04 74/473.21 |
| 5,197,003 A | 3/1993 | Moncrief et al. |
| 5,207,740 A | 5/1993 | Ikushima et al. |
| 5,379,872 A | 1/1995 | Dörr |

(Continued)

*Primary Examiner* — David M Fenstermacher
*Assistant Examiner* — Leonard J Archuleta
(74) *Attorney, Agent, or Firm* — Howard & Howard Attorneys PLLC

(57) ABSTRACT

A manual gear shifter assembly includes a shifter housing, a shift lever pivotally mounted to the shifter housing displaceable in a select direction to move between at least a first shift gate and a second shift gate, and in at least one shift direction for shifting the gears of the transmission, a shift cable coupled to the shift lever and the transmission, a blocker mounted in the shifter housing and operatively cooperating with the shift lever, a select lever pivotally mounted to the shifter housing with the select lever cooperating with the shift lever to allow displacement of the shift lever in the select direction to move between the shift gates, and a solenoid disposed in the shifter housing and cooperating with the blocker to physically block the displacement of the shift lever into a predetermined gear for inhibiting shifting of the transmission during a predetermined condition.

11 Claims, 11 Drawing Sheets

(56) References Cited

U.S. PATENT DOCUMENTS

| | | | |
|---|---|---|---|
| 5,566,581 A * | 10/1996 | Smale | B60R 25/02144 477/99 |
| 5,651,290 A * | 7/1997 | Osborn | B60R 25/02144 70/247 |
| 5,662,001 A * | 9/1997 | Smale | B60R 25/02144 477/99 |
| 5,695,029 A | 12/1997 | Yokoyama et al. | |
| 5,797,295 A | 8/1998 | Kataumi et al. | |
| 5,857,938 A * | 1/1999 | Porter | F16H 59/04 477/99 |
| 5,868,034 A | 2/1999 | McFadden | |
| 5,924,540 A | 7/1999 | Kim | |
| 6,176,809 B1 * | 1/2001 | Visser | B60R 25/02144 477/96 |
| 6,196,079 B1 * | 3/2001 | Paparoni | F16H 59/04 74/471 XY |
| 6,725,738 B2 * | 4/2004 | Okubo | F16H 61/18 74/473.22 |
| 6,892,600 B2 * | 5/2005 | Onuma | F16H 61/18 74/473.24 |
| 6,927,671 B2 | 8/2005 | DeBono | |
| 6,938,513 B2 * | 9/2005 | Kramer | F16H 59/042 74/473.21 |
| 7,124,874 B2 | 10/2006 | Wang | |
| 7,721,619 B2 | 5/2010 | Kamei | |
| 7,921,746 B2 * | 4/2011 | Giefer | F16H 61/22 74/473.21 |
| 8,230,756 B2 * | 7/2012 | Pajtas | F16C 1/10 74/473.22 |
| 8,316,734 B2 * | 11/2012 | Giefer | F16H 59/0204 74/473.12 |
| 8,371,188 B2 | 2/2013 | Bortolon et al. | |
| 2002/0166400 A1 | 11/2002 | Syamoto et al. | |
| 2004/0118236 A1 | 6/2004 | Tazai | |
| 2008/0022805 A1 | 1/2008 | Howe et al. | |
| 2010/0257970 A1 * | 10/2010 | Giefer | F16H 59/0204 74/473.21 |
| 2014/0373660 A1 | 12/2014 | Benson et al. | |
| 2014/0373661 A1 | 12/2014 | Benson et al. | |

* cited by examiner

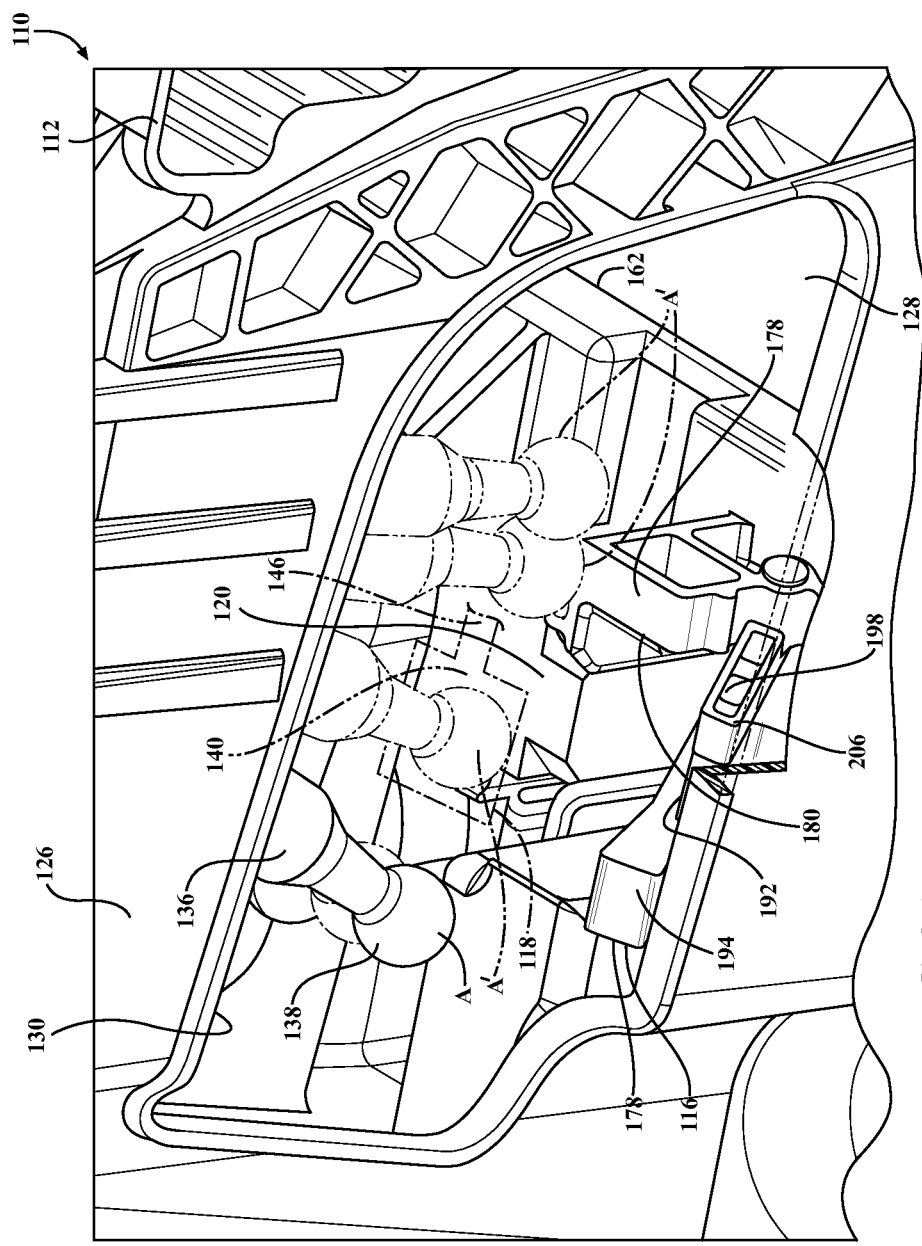

MANUAL GEAR SHIFTER ASSEMBLY

CROSS-REFERENCE TO RELATED APPLICATION(S)

The present invention claims the priority date of U.S. Provisional Patent Application Ser. No. 61/884,381, filed Sep. 30, 2013.

BACKGROUND OF THE INVENTION

1. Field of the Invention

The present invention relates generally to shifter assemblies for vehicles and, more specifically, to a manual gear shifter assembly for a transmission of a vehicle.

2. Description of the Related Art

It is known to provide a shifter for shift operating a transmission of a vehicle. One example of a shifter is disclosed in U.S. Pat. No. 7,124,875 to Wang. In this patent, the shifter includes a solenoid and a biasing member coupled to the solenoid such that when the solenoid is activated, the biasing member is moved. The shifter also includes a block coupled to the biasing member and a shift lever having a protrusion forming a nose extending towards the block. As the solenoid is activated, the biasing member moves in a vertical direction such that the blocker is moved into a position such that the motion of the nose, and in turn the shift lever, is blocked causing a "reverse gear lock-out".

It is desirable to provide a manual gear shifter assembly that prohibits engagement of specific gears of a transmission at inappropriate speeds. It is also desirable to provide a manual gear shifter assembly that prohibits a shift lever from entering a position where a gear of the transmission engages. It is further desirable to provide a manual gear shifter assembly that inhibits shifting above predetermined speeds in order to not damage a transmission. Thus, there is a need in the art for a manual gear shifter assembly that meets at least one of these desires.

SUMMARY OF THE INVENTION

Accordingly, the present invention is a manual gear shifter assembly for use with a transmission of a vehicle. The transmission has a plurality of gears. The assembly includes a shifter housing, a shift lever pivotally mounted to the shifter housing with the shift lever displaceable in a select direction to move between at least a first shift gate and a second shift gate, and displaceable in at least one shift direction when in any one of the shift gates for shifting the gears of the transmission, a shift cable coupled to the shift lever and for coupling to the transmission for selectively shifting the gears. The assembly also includes a blocker mounted in the shifter housing and operatively cooperating with the shift lever and a select lever pivotally mounted to the shifter housing with the select lever cooperating with the shift lever to allow displacement of the shift lever in the select direction to move between the shift gates. The assembly further includes a solenoid disposed in the shifter housing and cooperating with the blocker to physically block the displacement of the shift lever into a predetermined gear for inhibiting shifting of the transmission during a predetermined condition.

One advantage of the present invention is that a new manual gear shifter assembly is provided for a transmission of a vehicle. Another advantage of the present invention is that the manual gear shifter assembly prohibits engagement of specific gears of the transmission at inappropriate speeds. Yet another advantage of the present invention is that the manual gear shifter assembly includes one or more solenoids that are activated at defined speeds to prohibit the shift lever from entering a position where a gear of the transmission engages. Still another advantage of the present invention is that the manual gear shifter assembly blocks reverse gear by blocking the select lever. A further advantage of the present invention is that the manual gear shifter assembly inhibits shifting above predetermined speeds in order to not damage the transmission.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 1A is a plan view of a shift pattern for the manual gear shifter assembly of FIG. 1

FIG. 2A is a view similar to FIG. 2 illustrating a second operational position.

DESCRIPTION OF THE PREFERRED EMBODIMENT(S)

Figure 1:
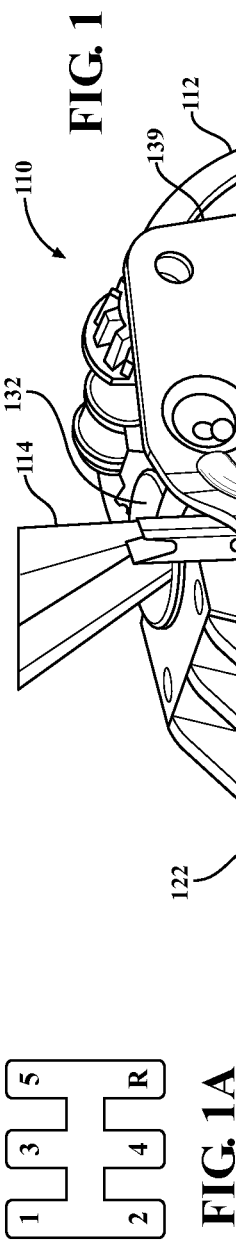
FIG. 1 is a perspective view of a manual gear shifter assembly, according to one embodiment of the present invention.

Referring now to the drawings, and in particular FIGS. 1 through 4, one embodiment of a manual gear shifter assembly 110, according to the present invention, is shown for use with a transmission (not shown) of a vehicle (not shown). The transmission has a plurality of gears (not shown). In this embodiment, the manual gear shifter assembly 110 includes a shifter housing 112, a shift lever 114, a blocker 116, a shift cable 118, and one or more solenoids 120. The manual gear shifter assembly 110 also includes a solenoid cassette 162 disposed in the shifter housing 112 and a select lever 139 pivotally connected to the shifter housing 112. The shifter housing 112, shift lever 114, blocker 116, shift cable 118, solenoids 120, select lever 139, and solenoid cassette 162 will be described below in more detail.

The manual gear shifter assembly 110 allows displacement of the shift lever 114 in shift (back-forth) and select (right-left) directions for a shift pattern, one embodiment of which is illustrated in FIG. 1A. The shift lever 114 is displaced in at least a first shift direction and a second shift direction for shifting the gears, for examples gears 1 or 2, and in a select direction for selecting between at least a first shift gate, for example gears 1 and 2, and a second shift gate, for example gears 3 and 4, for the shift direction. The displacement of the shift lever 114 in the shift direction is transferred through the shift cable 118, which is connected to the shift lever 114, while displacement of the shift lever 114 in the select direction is transferred through the select lever 139, which is connected to a select cable (not shown). It should be appreciated that shift displacement by the shift lever 114 will not result in select displacement of the select lever 139 while select displacement of the select lever 139 will not result in shift displacement of the shift lever 114.

The manual gear shifter assembly 110 also blocks shift displacement of the shift lever 114 and select displacement of the select lever 139. When it comes to blocking shift displacement, the blocker 116 will physically block shift displacement of the shift lever 114 to a specific gear. In one embodiment, the specific gear is the first gear. The blocker 116 is "activated" by one or a first of the solenoids 120 during at least a first predetermined condition, for example, when the vehicle is travelling above a predetermined speed, for example, thirty-one miles per hour (31 mph).

When it comes to blocking select displacement, one or a second of the solenoids 120 will physically block select displacement of the select lever 139 from being displaced beyond a certain point and effectively block out a "shift gate" (for example, as illustrated in FIG. 1A, where a typical double-H shift pattern for a manual shifter includes three shift gates: 1-2, 3-4, and 5-R), since the shift lever 114 needs to be displaced in the select direction to move between the shift gates. Thus, when this solenoid 120 is activated, it will physically block out the shift gate, for example, both gears 1 and 2. The activation of this solenoid 120 will occur during at least a second predetermined condition, for example, when the vehicle is travelling above a predetermined speed, for example, fifty-six miles per hour (56 mph).

As illustrated in FIG. 1, the shifter housing 112 includes a top wall 122, bottom wall 124, and side walls 126 extending between the top wall 122 and the bottom wall 124 to form a hollow chamber 128 therein. Opposed side walls 126 may include an aperture 130 extending therethrough to communicate with the chamber 128. The top wall 122 has an aperture 132 extending therethrough and communicating with the chamber 128 to receive the shift lever 114. The bottom wall 124 may have one or more apertures 134 extending therethrough. The shifter housing 112 has a generally rectangular shape, but may be any suitable shape. The shifter housing 112 is connected to structure of the vehicle by a suitable mechanism such as fasteners (not shown) extending through the apertures 134 in the bottom wall 124.

Figure 2:
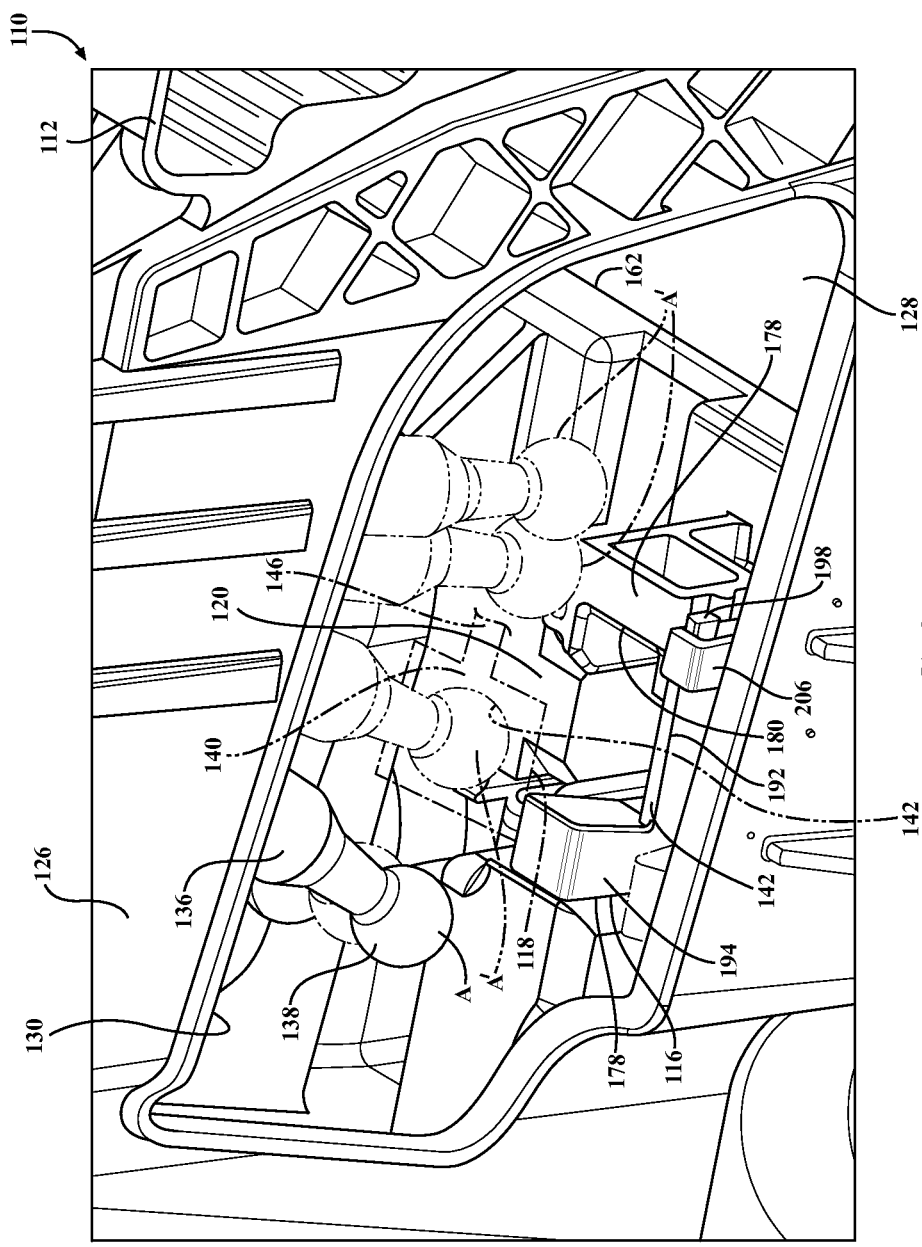
FIG. 2 is a perspective view of a portion of the manual gear shifter assembly of FIG. 1 illustrating a first operational position.

Referring to FIGS. 1 and 2, the shift lever 114 includes a shift member or knob (not shown) and a rod or shaft 136 attached to the knob. The shaft 136 has an end member 138 cooperating with the shift cable 118. The manual gear shifter assembly 110 also includes the select lever 139 pivotally connected to the shaft 136 and the shifter housing 112. The select lever 139 is generally "L" shaped, but may be any suitable shape. The select lever 139 is similar to a select lever 239 to be described in connection with an embodiment of FIGS. 5 through 10. It should be appreciated that the shift lever 114 is pivotally coupled to the shifter housing 112 and the shaft 136 extends through the aperture 132 in the shifter housing 112 and into the chamber 128. It should also be appreciated that the select lever 139 is disposed outside the chamber 128 exterior to the shifter housing 112 and pivotally connected to the shaft 136 and shifter housing 112.

Referring to FIGS. 2 and 2A, the manual gear shifter assembly 110 also includes the shift cable 118 cooperating with the shift lever 114 and the transmission. The shift cable 118 includes a terminal connector 140 disposed in the chamber 128 of the shifter housing 112 and cooperating with the shift lever 114. The terminal connector 140 is generally rectangular in shape, but may be any suitable shape. The terminal connector 140 has a cavity 142 extending therein for receiving the end member 138 of the shift lever 114. The shift cable 118 also includes a cable 146 having one end connected to the terminal connector 140 and another end connected to the transmission for shifting the transmission. It should be appreciated that the shift lever 114 and terminal connector 140 move as a unit. It should also be appreciated that the shift lever 114, connected to the terminal connector 140, pushes or pulls the cable 118 to shift the transmission.

Figure 3:
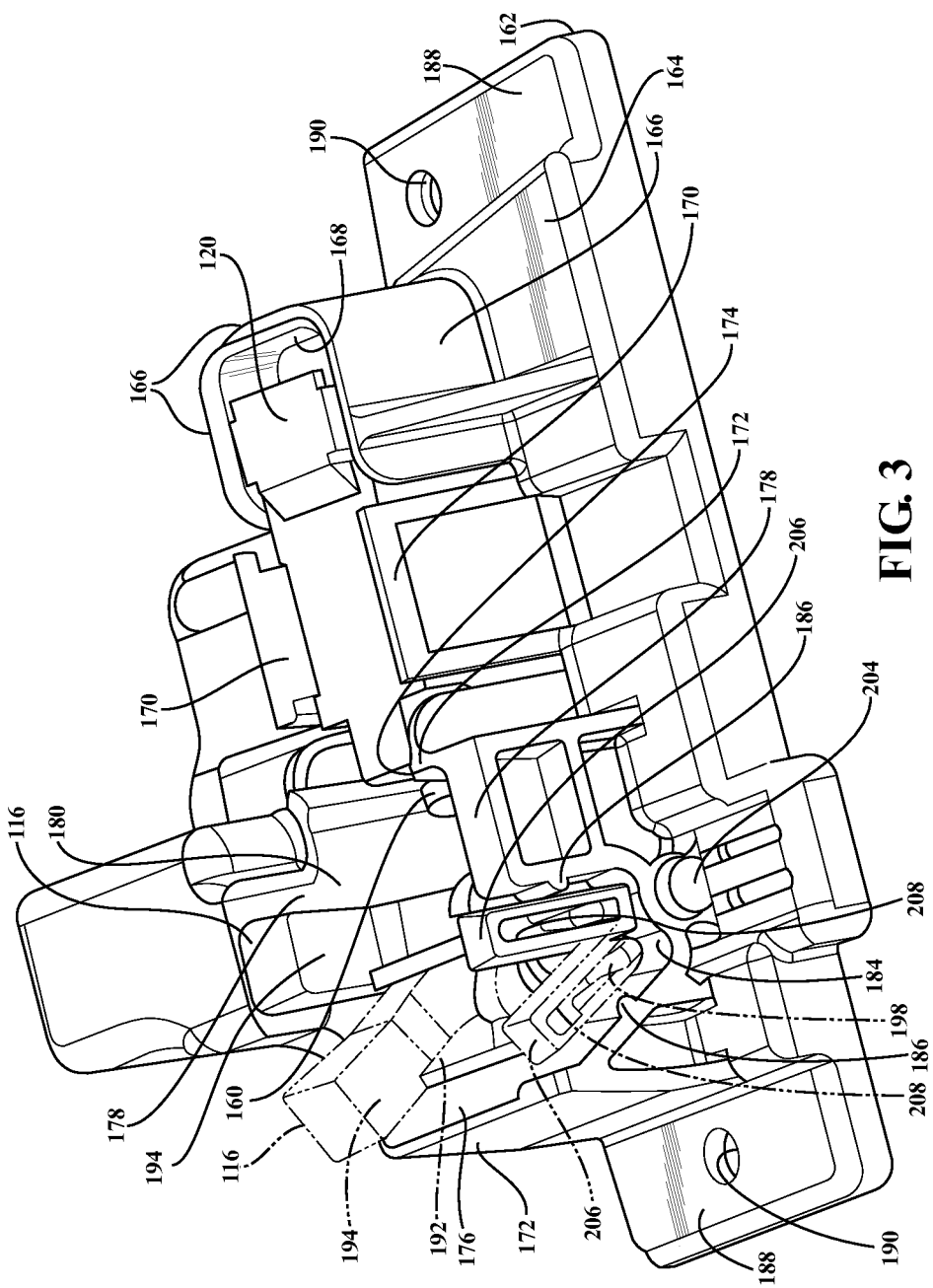
FIG. 3 is a perspective view of another portion of the manual gear shifter assembly of FIG. 1.
Figure 4:
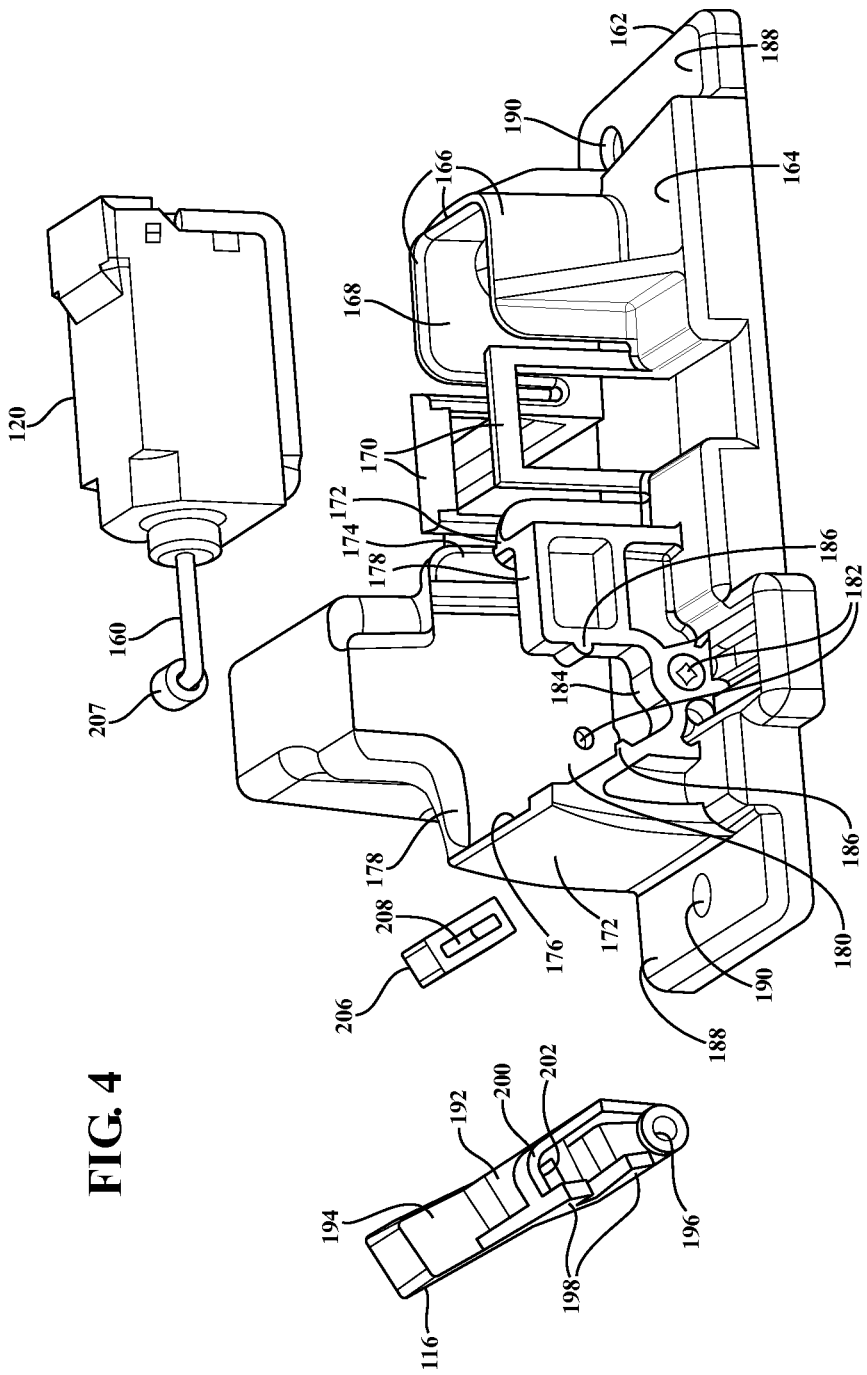
FIG. 4 is an exploded view of the portion of the manual gear shifter assembly of FIG. 3.

Referring to FIGS. 1 through 4, the manual gear shifter assembly 110 includes a solenoid cassette 162 disposed in the chamber 128 of the shifter housing 112. As illustrated in FIGS. 3 and 4, the solenoid cassette 162 has a base 164 and a plurality of first side walls 166 extending upwardly from the base 164 to form a cavity 168 to receive one or a first solenoid 120. The solenoid cassette 162 also has a pair of opposed retaining walls 170 extending upwardly from the base 164 and spaced longitudinally from the first side walls 166 to retain the solenoid 120 to the base 164. The solenoid cassette 162 has a plurality of end walls 172 extending upwardly from the base 164 and spaced longitudinally from the retaining walls 170 and from each other. In the embodiment illustrated, one of the end walls 172 adjacent to the retaining walls 170 has an aperture 174 extending therethrough to allow a plunger 160 of the solenoid 120 to extend therethrough. Another one of the end walls 172 has an inclined inner surface 176 to cooperate with the blocker 116. The solenoid cassette 162 has a pair of second side walls 178 extending upwardly from the base 164 between the end walls 172 to form a cavity 180 therein. The second side walls 178 include an aperture 182 extending therethrough and communicating with the cavity 180. One of the second side walls 178 also includes a recess 184 extending therein and spaced upwardly from the aperture 182. The second side wall 178 with the recess 184 has one or more projections 186 extending into the recess 184 from opposed sides thereof. The solenoid cassette 162 also has a plurality of flanges 188 extending outwardly from the base 164. In the embodiment illustrated, one of the flanges 188 extends longitudinally from each longitudinal end of the base 164. The flanges 188 are generally rectangular in shape, but may be any suitable shape. The flanges 188 have at least one aperture 190 extending therethrough. It should be appreciated that the solenoid cassette 162 is mounted to the shifter housing 112 by a suitable mechanism such as fasteners (not shown) extending through the apertures 190 in the flanges 188 of the solenoid cassette 162 and engaging the shifter housing 112.

The manual gear shifter assembly 110 also includes a blocker 116 disposed in the chamber 128 of the shifter housing 112 and cooperating with the shift lever 114. In the embodiment illustrated, the blocker 116 is generally "L" shaped, but may be any suitable shape. The blocker 116 has an arm portion 192 and a blocking portion 194 extending from the arm portion 192. The arm portion 192 has a length greater than the blocking portion 194. The blocker 116 also has an aperture 196 extending through the arm portion 192. The blocker 116 also has one or more projections 198 extending outwardly from the arm portion 192. In the embodiment illustrated, a pair of the projections 198 extends outwardly from the arm portion 192 and spaced from each other. The projections 198 are generally rectangular in shape, but may be any suitable shape. The gear blocker 116 also has a flange 200 spaced along the arm portion 192 and extending outwardly. The flange 200 has an aperture 202 extending there-through to receive a portion of the plunger 160 of the solenoid 120. It should also be appreciated that the blocker 116 is moved by the solenoid 120 and cooperates with the terminal connector 140 to allow or block movement of the terminal connector 140 as illustrated in FIGS. 2 and 2A.

The manual gear shifter assembly 110 includes a pivot pin 204 to pivotally connect the blocker 116 to the solenoid cassette 162. The pivot pin 204 is generally cylindrical in shape. The pivot pin 204 extends through the aperture 196 of the arm portion 192 of the blocker 116 and the apertures 182 in the side walls 178 of the solenoid cassette 162. It should be appreciated that the blocker 116 is disposed in the cavity 180 of the solenoid cassette 162 and pivotally connected to the solenoid cassette 162 for pivotal movement therein. The blocker 116 is therefore pivotally mounted to the shifter housing 112 for pivotal movement between engaged and dis-engaged positions. It should be appreciated that the blocker 116 can be pivotally mounted to the shifter housing 112 in any suitable manner without deviating from the scope of the present invention.

As illustrated in FIGS. 3 and 4, the blocker 116 has the arm portion 192 adjacent the blocking portion 194 and disposed on the opposite side from the shift lever 114. The wall 178 facing the side of the blocker 116, which is opposite the side of the blocker 116 which engages the shift lever 114, abuts or controls the blocker 116 if the shift lever 114 is forcefully displaced towards the blocked position. If the shift lever 114 is forcefully displaced towards the blocked position, the blocker 116 may come to deflect slightly, which would result in the blocker 116 abutting the wall 178, which will reduce the mechanical stress on the blocker 116 and its pivot pin 204.

The manual gear shifter assembly 110 further includes a sound absorbing member 206 cooperating with the blocker 116 to reduce the sound of contact between the blocker 116 and the solenoid cassette 162. The sound absorbing member 206 is of a closed shape forming an aperture 208 extending therethrough. The sound absorbing member 206 is generally rectangular in shape, but may be any suitable shape. The sound absorbing member 206 is disposed over the projections 198 of the blocker 116 such that the projections 198 extend through the aperture 208. The sound absorbing member 206 is made of a sound absorbing material. It should be appreciated that the sound absorbing member 206 contacts the projections 186 of the recess 184 when the blocker 116 is pivoted by the solenoid 120 to absorb and reduce the sound of contact.

The manual gear shifter assembly 110 also includes one or more solenoids 120 cooperating with the blocker 116 and the select lever 139. In the embodiment illustrated, one or first solenoid 120 is disposed in the cavity 168 of the solenoid cassette 162 and retained thereto by the retaining walls 170. The first solenoid 120 includes a coil (not shown) that receives power from a source of power (not shown) and a plunger 160 cooperating with the coil. The plunger 160 is extended or retracted to cooperate with the blocker 116. It should be appreciated that, when the coil receives power, a magnetic field is created to either extend or retract the plunger 160.

As eluded to above, the solenoid 120 cooperates with the blocker 116 to pivot the blocker 116 into the engaged position to physically block the displacement of the shift lever 114 into a predetermined gear for inhibiting shifting of the transmission during a predetermined condition. The solenoid 120 also cooperates with the blocker 116 to pivot the blocker 116 into the dis-engaged position spaced from the shift lever 114 to physically allow the displacement of the shift lever 114 into the predetermined gear for allowing shifting of the transmission in the absence of the predetermined condition.

In the embodiment illustrated, the plunger 160 is generally "L" shaped, but may be any suitable shape. One end of the plunger 160 extends through the aperture 202 of the blocker 116. The first solenoid 120 may include a retaining or sound absorbing member 207 at one end of the plunger 160 to prevent the end of the plunger 160 from exiting the aperture 202 of the blocker 116. The sound absorbing member 207 is of a ring type having a generally circular shape, but may be any suitable shape. The sound absorbing member 207 is secured to the end of the plunger 160 by a suitable mechanism such as press-fitting. It should be appreciated that the first solenoid 120 moves the plunger 160 linearly to pivot the blocker 116 about the pin 204.

As illustrated in FIG. 1, another or second solenoid 120 is disposed in a cavity 209 of the shifter housing 112. The second solenoid 120 includes a coil (not shown) that receives power from a source of power (not shown) and a plunger 160 cooperating with the coil that extends and retracts to allow or inhibit movement of the select lever 139 of the shift lever 114. It should be appreciated that the second solenoid 120 moves the plunger 160 linearly to block the select lever 139. It should also be appreciated that the second solenoid 120 is secured in the cavity 209 of the shifter housing 112 by a suitable mechanism such as press-fitting, snap-fitting, or fasteners (not shown).

In operation of the manual gear shifter assembly 110, the shift lever 114 is pivoted by an operator to move to one or more gear engaging positions A to shift the transmission and one or more intermediate positions A' between the gear engaging positions A as illustrated in FIG. 1. As the shift lever 114 pivots, the motion of the shift lever 114 activates the shift cable 118, transferring the motion of the end member 138 to the terminal connector 140 of the shift cable 118 to move to one of the gear engaging positions A to shift the transmission. However, under certain conditions such as at predetermined speeds of the vehicle, the first solenoid 120 in the solenoid cassette 162 can be activated to move the plunger 160 and pivot the blocker 116 toward the first solenoid 120. In this engaged or blocked position, the blocking portion 194 would engage the terminal connector 140 if the shift lever 114 was displaced towards the blocked position, thereby prohibiting the shift lever 114 from entering one of the gear engaging positions to shift the transmission as illustrated in FIG. 2. It should be appreciated that when the first solenoid 120 is not activated, the blocker 116 is pivoted toward the dis-engaged position away from the first solenoid 120 to the inclined surface 176 of the solenoid cassette 162 and the motion of the shift lever 114 allows the terminal connector 140 of the shift cable 118 to move to one of the gear engaging positions A to shift the transmission as illustrated in FIG. 2A.

When an operator of the vehicle may push or pull the shift lever 114 right-left to select a gear shift gate in the transmission, the select lever 139 may be pivoted. Under certain conditions such as the speed of the vehicle being above a predetermined speed for a particular shift gate of the transmission, the second solenoid 120 in the shifter housing 112 is energized or activated to extend the plunger 160, which in turns, prevents the select lever 139 from rotating beyond a predetermined point and prevents the operator from placing the shift lever 114 into the particular shift gate of the transmission. It should be appreciated that the plunger 160 of the second solenoid 120 cooperates with the free end of the select lever 139 in the extended position to block the select lever 139 from moving and preventing the operator from placing the shift lever 114 into the shift gate of the transmission.

When the speed of the vehicle is at or below the predetermined speed for the particular shift gate of the transmission, the second solenoid 120 in the shifter housing 212 is de-energized or de-activated to retract the plunger 160, which then allows the select lever 139 to rotate beyond the predetermined point and allow the operator to place the shift lever 114 into the particular shift gate of the transmission. It should be appreciated that the plunger 160 of the second solenoid 120 is spaced from the free end of the select lever 139 in the retracted position to allow the select lever 139 to move and allow the operator to place the shift lever 114 into the shift gate of the transmission.

Referring to FIGS. 5 through 10, another embodiment, according to the present invention, of the manual gear shifter assembly 110 is shown. Like parts of the manual gear shifter assembly 110 have like reference numerals increased by one hundred (100). In this embodiment, the manual gear shifter assembly 210 includes a shifter housing 212, a shift lever 214, a blocker 216, a shift cable 218, and one or more solenoids 220. The manual gear shifter assembly 210 also includes a solenoid cassette 262 disposed in the shifter housing 212. The shift lever 214, blocker 216, solenoids 220, select lever 239, and solenoid cassette 262 will be described below in more detail.

Figure 5:
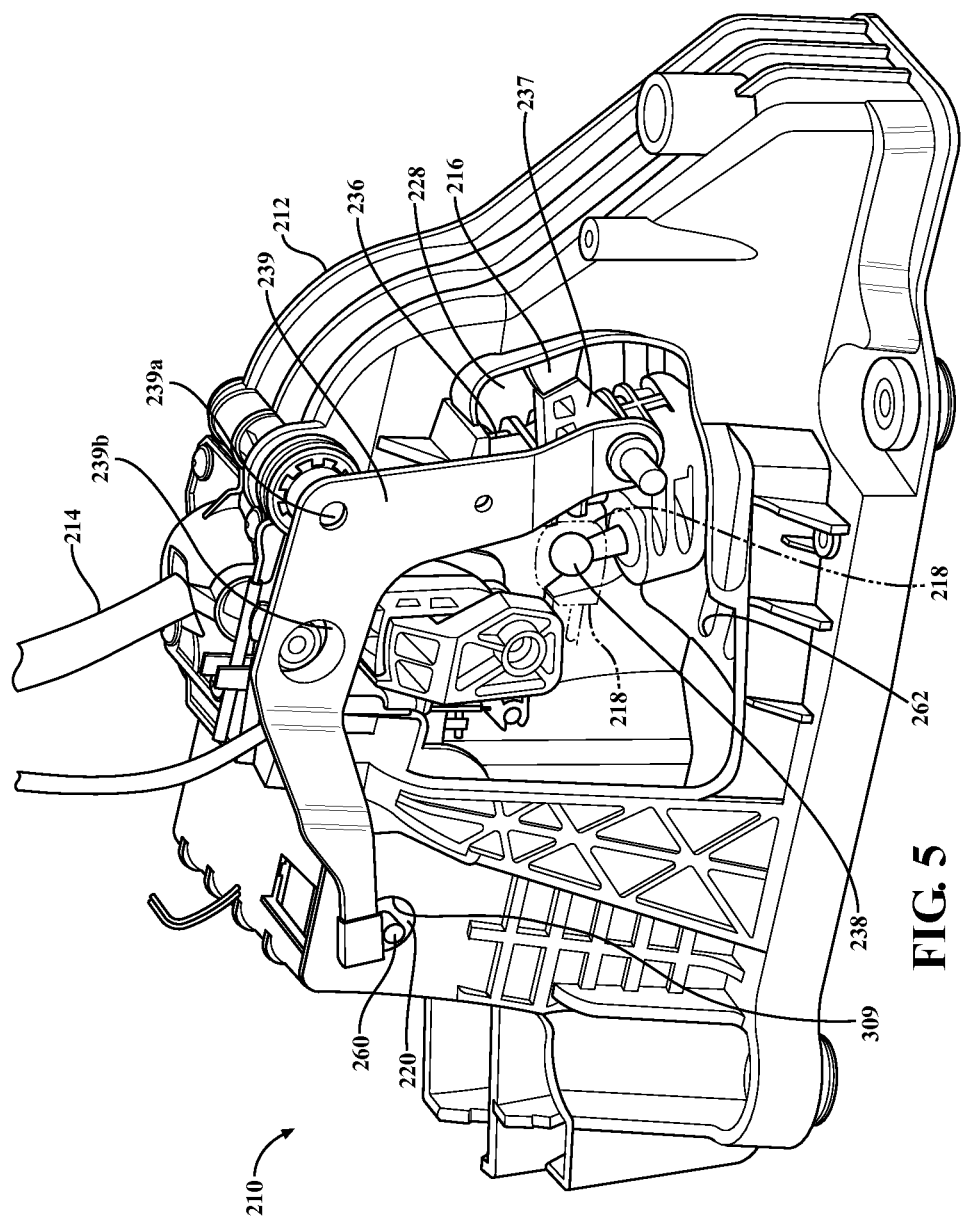
FIG. 5 is a perspective view of another embodiment, according to the present invention, of the manual gear shifter assembly of FIGS. 1 through 4.
Figure 5A:
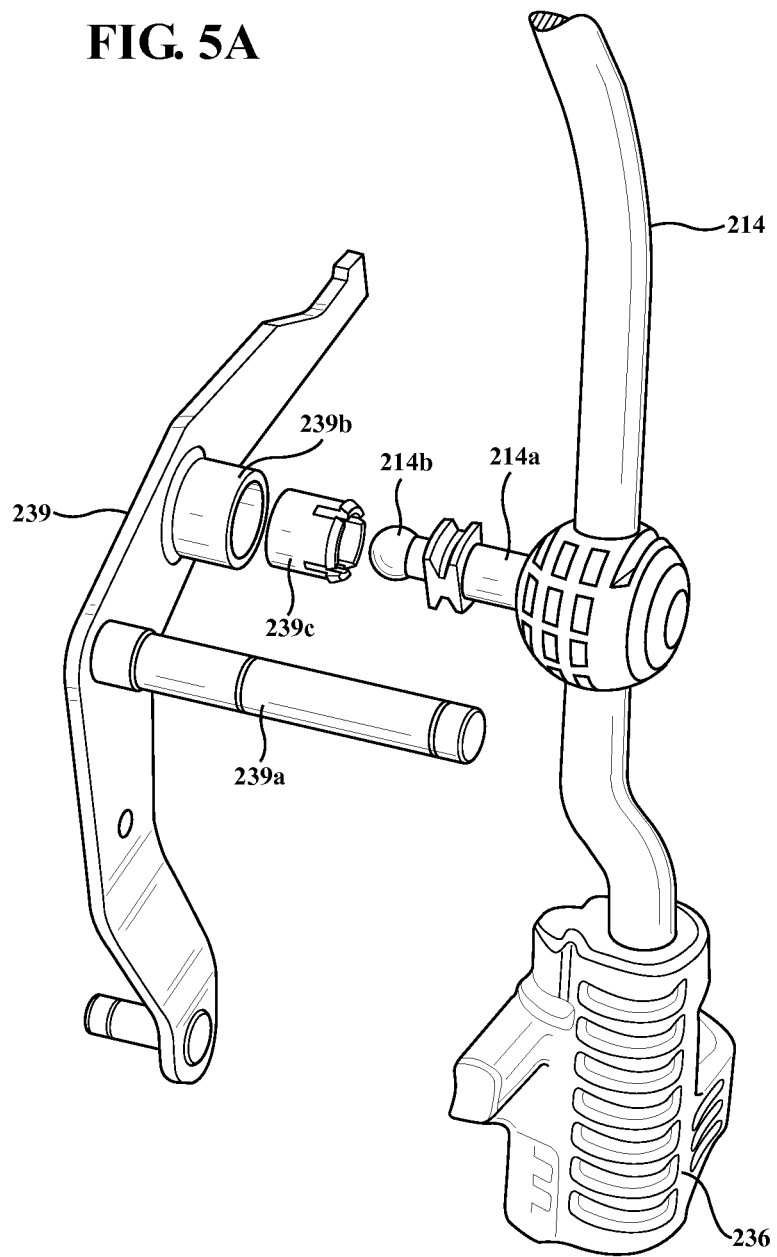
FIG. 5A is an exploded view of a portion of the manual gear shifter assembly of FIG. 5.
Figure 6:
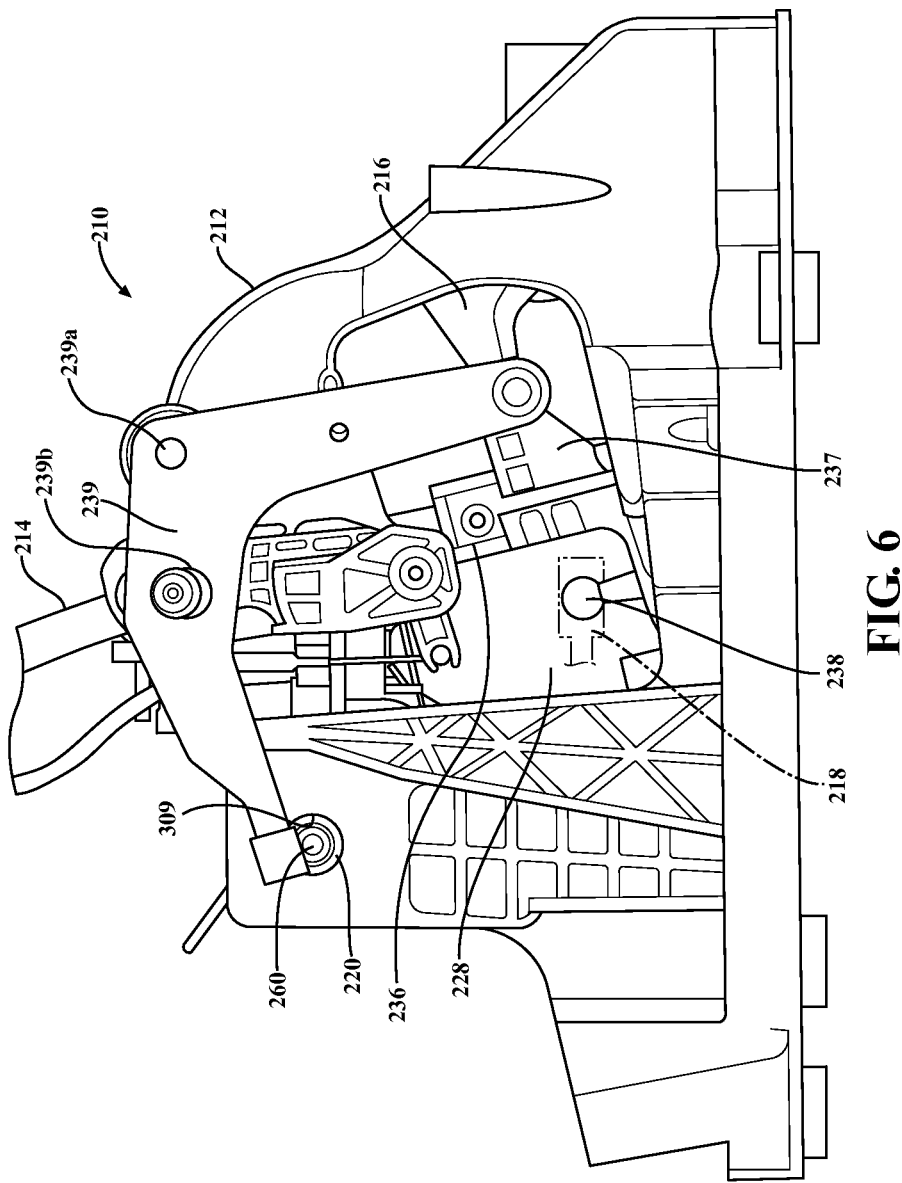
FIG. 6 is an elevational view of the manual gear shifter assembly of FIG. 5.

As illustrated in FIG. 5A, the select lever 239 is connected to the shift lever 214 and the shifter housing 212. More specifically, the shift lever 214 is pivotally coupled to the shifter housing 212 by a rod or shaft 239a that extends through an aperture and into the shifter housing 212. The select lever 239 has a receiver 239b extending from a rear side thereof. The receiver 239 is generally cylindrical in shape to receive a coupling 239c disposed therein. The shift lever 214 includes a projection or shift finger 214a extending generally perpendicularly thereto and having a spherically shaped end 214b to be received by the coupling 239c. It should be appreciated that the end 214b rotates or pivots inside the coupling 239c to allow the select lever 239 and shift lever 214 to be pivotally coupled together. It should also be appreciated that the select lever 239 is disposed outside the chamber 228 exterior to the shifter housing 212.

The manual gear shifter assembly 210 blocks shift displacement of the shift lever 214 and select displacement of the select lever 239. When it comes to blocking shift displacement, the blocker 216 will block shift displacement of the shift lever 214 to a specific gear. In one embodiment, the specific gear is the first gear. The blocker 216 is "activated" by one of the solenoids 220 under certain conditions, for example, when the vehicle is traveling above a predetermined speed, for example, thirty-one miles per hour (31 mph).

When it comes to blocking select displacement, one of the solenoids 220 will block select displacement of the select lever 239 from being displaced beyond a certain point and effectively block out a "shift gate" (for example, as illustrated in FIG. 1A, where a typical double-H shift pattern for a manual shifter includes three shift gates: 1-2, 3-4, and 5-R), since the shift lever 214 needs to be displaced in the select direction to move between the shift gates. Thus, when this solenoid 220 is activated, it will block out the shift gate, for example, both gears 1 and 2. The activation of this solenoid 220 will occur under certain conditions, for example, when the vehicle is travelling above a predetermined speed, for example, fifty-six miles per hour (56 mph).

Referring to FIGS. 5 through 8, the shift lever 214 includes a shift member or knob (not shown) and a rod or shaft 236 attached to the knob. The shaft 236 has an end member 238 cooperating with the shift cable 218. The shaft 236 also includes a projection 237 extending outwardly from the shaft 236 for cooperating with the blocker 216. The projection 237 is generally triangular in shape, but may be any suitable shape.

Figure 7:
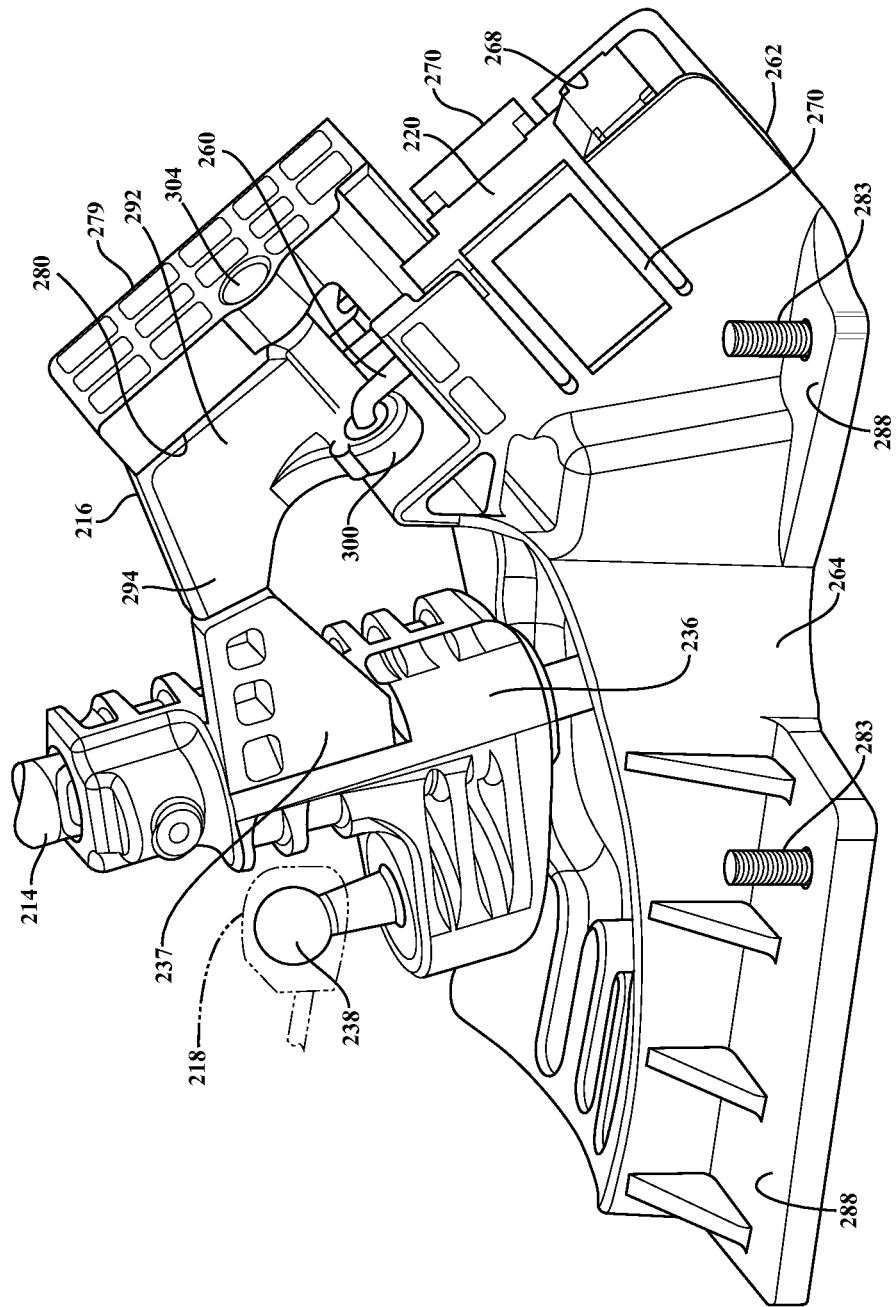
FIG. 7 is a perspective view of a portion of the manual gear shifter assembly of FIG. 5 illustrated in a first operational position.
Figure 8:
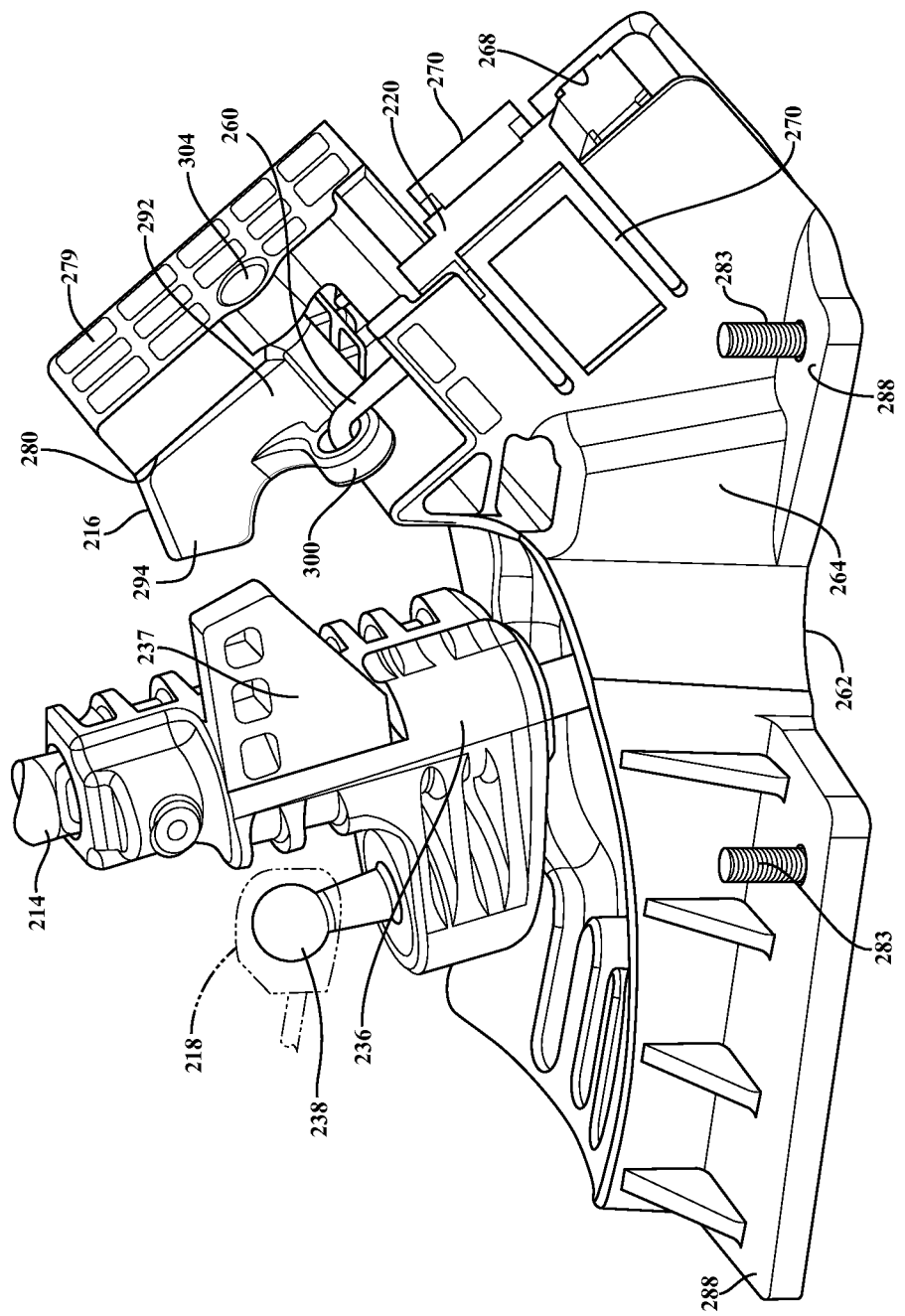
FIG. 8 is a view similar to FIG. 7 illustrated in a second operational position.

Referring to FIG. 7, the manual gear shifter assembly 210 includes a solenoid cassette 262 disposed in the chamber 228 of the shifter housing 212. As illustrated in FIGS. 7 and 8, the solenoid cassette 262 has a base 264 with a cavity 268 to receive one or a first solenoid 220. The solenoid cassette 262 also has a pair of opposed retaining walls 270 extending from the base 264 to retain the first solenoid 220 to the base 264. The solenoid cassette 262 also has a wall 279 extending upwardly from the base 264 to form a cavity 280 therein. The wall 279 is generally inverted "L" shaped, but may be any suitable shape. It should be appreciated that the solenoid cassette 262 is loaded into the bottom of the shifter housing 212 and mounted to the shifter housing 212 by a suitable mechanism such as fasteners 283 extending through the flanges 288 of the solenoid cassette 262.

The manual gear shifter assembly 210 also includes a blocker 216 disposed in the chamber 228 of the shifter housing 212 and cooperating with the shift lever 214. In the embodiment illustrated, the blocker 216 is generally "L" shaped, but may be any suitable shape. The blocker 216 has an arm portion 292 and a blocking portion 294 extending from the arm portion 292. The blocker 216 also has a flange 300 spaced along the arm portion 292 and extending outwardly. The flange 300 cooperates with a plunger 260 of the first solenoid 220. It should also be appreciated that the blocker 216 is moved by the first solenoid 220 and cooperates with the projection 237 on the shaft 236 of the shift lever 214.

The manual gear shifter assembly 210 includes a pivot pin 304 to pivotally connect the blocker 216 to the solenoid cassette 262. The pivot pin 304 is generally cylindrical in shape. The pivot pin 304 extends through the arm portion 292 of the blocker 216 and the wall 279 and base 264 of the solenoid cassette 262. It should be appreciated that the blocker 216 is disposed in the cavity 280 of the solenoid cassette 262 and pivotally connected to the solenoid cassette 262 for pivotal movement therein. The blocker 216 is therefore pivotally mounted to the shifter housing 212 for pivotal movement between engaged and dis-engaged positions. It should be appreciated that the blocker 216 can be pivotally mounted to the shifter housing 212 in any suitable manner without deviating from the scope of the subject invention.

As illustrated in FIGS. 7 and 8, the blocker 216 has the arm portion 292 adjacent the blocking portion 294 and disposed on the opposite side from the shift lever 214. The wall 280 facing the side of the blocker 216, which is opposite the side of the blocker 216 which engages the shift lever 214, abuts or controls the blocker 216 if the shift lever 214 is forcefully displaced towards the blocked position. If the shift lever 214 is forcefully displaced towards the blocked position, the blocker 216 may come to deflect slightly, which would result in the blocker 216 abutting the wall 280, which will reduce the mechanical stress on the blocker 216 and its pivot pin 304.

The manual gear shifter assembly 210 further includes one or more solenoids 220 cooperating with the blocker 216 and select lever 239. In the embodiment illustrated, one or first solenoid 220 is disposed in the cavity 268 of the solenoid cassette 262 and retained thereto by the retaining walls 270. The first solenoid 220 includes a coil (not shown) that receives power from a source of power (not shown) and a plunger 260 cooperating with the coil. The plunger 260 is extended or retracted to cooperate with the blocker 216. It should be appreciated that, when the coil receives power, a magnetic field is created to either extend or retract the plunger 260.

As eluded to above, the solenoid 220 cooperates with the blocker 216 to pivot the blocker 216 into the engaged position to physically block the displacement of the shift lever 214 into one of the first and second shift directions for inhibiting shifting of the transmission into a predetermined gear during a predetermined condition. The solenoid 220 also cooperates with the blocker 216 to pivot the blocker 216 into the dis-engaged position spaced from the shift lever 214 to physically allow the displacement of the shift lever 214 into one of the first and second shift directions for allowing shifting of the transmission into the predetermined gear in the absence of the predetermined condition.

In the embodiment illustrated, the plunger 260 is generally "L" shaped, but may be any suitable shape. One end of the plunger 260 extends through the flange 300 of the gear blocker 216. The first solenoid 220 may include a retaining or sound absorbing member (not shown) at one end of the plunger 260 to prevent the end of the plunger 260 from exiting the flange 300 of the blocker 216. The sound absorbing member is of a ring type having a generally circular shape, but may be any suitable shape. The sound absorbing member is secured to the end of the plunger 260 by a suitable mechanism such as press-fitting. It should be appreciated that the first solenoid 220 moves the plunger 260 linearly to pivot the blocker 216 about the pivot pin 304.

Figure 9:
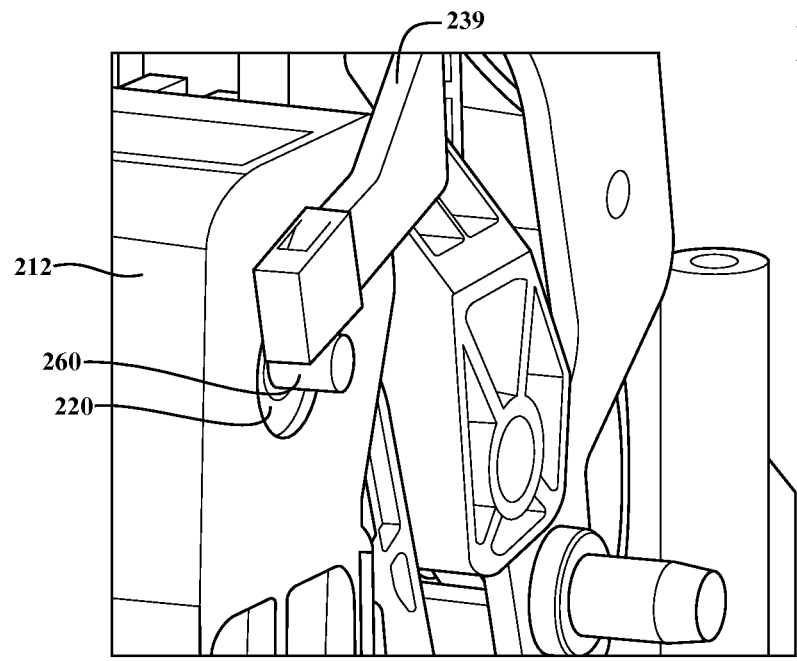
FIG. 9 is a perspective view of another portion of the manual gear shifter assembly of FIG. 5 illustrated in a first operational position.
Figure 10:
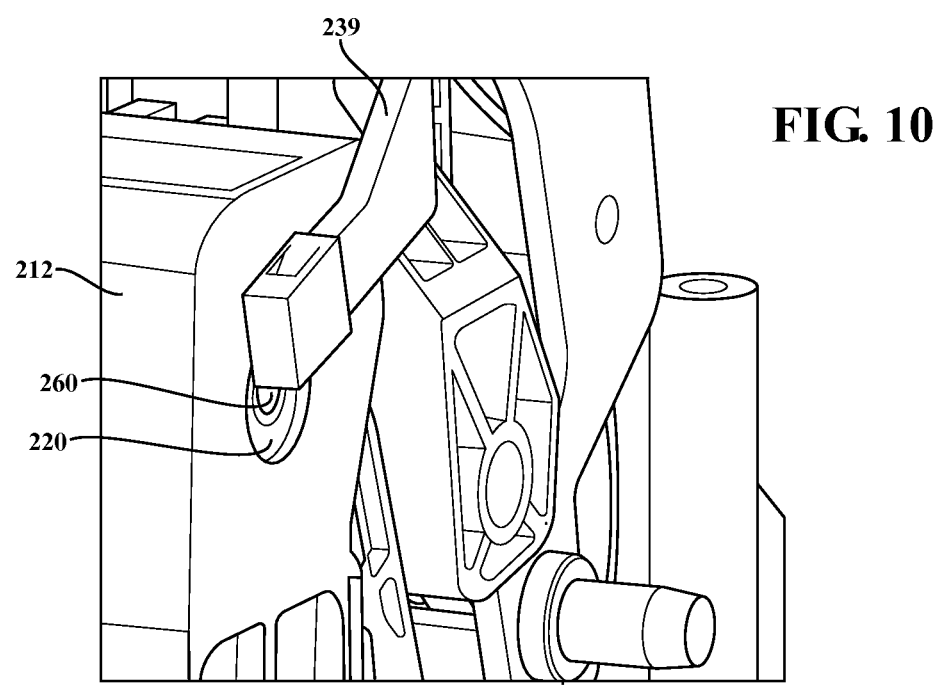
FIG. 10 is a view similar to FIG. 9 illustrated in a second operational position.

As illustrated in FIGS. 9 and 10, another or second solenoid 220 is disposed in a cavity 309 of the shifter housing 212. The second solenoid 220 includes a coil (not shown) that receives power from a source of power (not shown) and a plunger 260 cooperating with the coil that extends and retracts to allow or inhibit movement of the select lever 239 of the shift lever 214. It should be appreciated that the second solenoid 220 moves the plunger 260 linearly to block the select lever 239. It should also be appreciated that the second solenoid 220 is secured in the cavity 309 of the shifter housing 212 by a suitable mechanism such as press-fitting or fasteners (not shown).

In operation of the manual gear shifter assembly 210, the shift lever 214 is pivoted by an operator to move to one or more gear engaging positions to shift the transmission. As the shift lever 214 pivots, the motion of the shift lever 214 activates the shift cable 218, transferring the motion of the end member 238 to the terminal connector 240 of the shift cable 218 to move to one of the gear engaging positions to shift the transmission. However, under certain conditions such as at predetermined speeds of the vehicle, the first solenoid 220 in the solenoid cassette 262 can be activated to move the plunger 260 and pivot the blocker 216 to the engaged or blocked position. In this position, the blocking portion 294 of the blocker 216 would engage the projection 237 of the shaft 236 if the shift lever 214 was displaced toward the blocked position and restrict movement of the shift lever 214, thereby prohibiting the shift lever 214 from entering the gear engaging position to shift the transmission as illustrated in FIG. 7. It should be appreciated that when the first solenoid 220 is not activated, the blocker 216 is pivoted away from the first solenoid 220 and the motion of the shift lever 214 allows the shift lever 214 to move to one of the gear engaging positions to shift the transmission as illustrated in FIG. 8.

For example, under certain conditions such as the speed of the vehicle being above a predetermined speed for a particular gear of the transmission, the first solenoid 220 in the solenoid cassette 262 is energized or activated to retract the plunger 260, which rotates the blocker 216 into the engaged or blocked position, which then prevents the operator from placing the shift lever 214 into the particular gear of the transmission as illustrated in FIG. 7. It should be appreciated that the blocker 216 cooperates with the projection 237 on the shaft 236 of the shift lever 214 in the blocked position to block the shift lever 214 from engaging the particular gear of the transmission.

When the speed of the vehicle is at or below the predetermined speed for the particular gear of the transmission, the first solenoid 220 in the solenoid cassette 262 is de-energized or de-activated to extend the plunger 260, which rotates the blocker 216 into the dis-engaged or non-blocked position, which then allows the operator to place the shift lever 214 into the particular gear of the transmission as illustrated in FIG. 8. It should be appreciated that the blocker 216 is spaced from the projection 237 on the shaft 236 of the shift lever 214 in the extended position to allow the shift lever 214 to engage the particular gear of the transmission.

When an operator of the vehicle may push or pull the shift lever 214 right-left to select a gear shift gate in the transmission, the select lever 239 may be pivoted. Under certain conditions such as the speed of the vehicle being above a predetermined speed for a particular shift gate of the transmission, the second solenoid 220 in the shifter housing 212 is energized or activated to extend the plunger 260, which in turns, prevents the select lever 239 from rotating and prevents the operator from placing the shift lever 214 into the shift gate of the transmission as illustrated in FIG. 9. It should be appreciated that the plunger 260 of the second solenoid 220 cooperates with the free end of the select lever 239 in the extended position to block the select lever 239 from moving and prevents the operator from placing the transmission into the shift gate of the transmission.

When the speed of the vehicle is at or below the predetermined speed for the particular shift gate of the transmission, the second solenoid 220 in the shifter housing 212 is de-energized or de-activated to retract the plunger 260, which then allows the select lever 239 to rotate and allows the operator to place the shift lever 214 into the shift gate of the transmission as illustrated in FIG. 10. It should be appreciated that the plunger 260 of the second solenoid 220 is spaced from the free end of the select lever 239 in the retracted position to allow the select lever 239 to move and allow the operator to place the transmission into the shift gate of the transmission.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A manual gear shifter assembly for use with a transmission of a vehicle, the transmission having a plurality of gears, said assembly comprising:
   a shifter housing;
   a shift lever pivotally mounted to said shifter housing with said shift lever displaceable in a select direction to move between at least a first shift gate and a second shift gate, and displaceable in at least one shift direction when in any one of said shift gates for shifting the gears of the transmission;
   a shift cable coupled to said shift lever and for coupling to the transmission for selectively shifting the gears;
   a blocker pivotally mounted in said shifter housing and operatively cooperating with said shift lever;
   a select lever pivotally mounted to said shifter housing with said select lever cooperating with said shift lever to allow displacement of said shift lever in said select direction to move between said shift gates;
   a solenoid disposed in said shifter housing and cooperating with said blocker to pivot said blocker transverse to said displacement of said shift lever to physically block said displacement of said shift lever into a predetermined gear for inhibiting shifting of the transmission during a predetermined condition;
   wherein said blocker has an arm portion cooperating with said solenoid and a blocking portion extending from said arm portion for operatively cooperating with said shift lever; and
   wherein said blocker includes a flange spaced along said arm portion and extending outwardly, said flange having an aperture extending therethrough.

2. A manual gear shifter assembly as set forth in claim 1 including a solenoid cassette disposed in said housing and having a cavity to receive said solenoid.

3. A manual gear shifter assembly as set forth in claim 2 including a pivot pin pivotally connecting said blocker to said solenoid cassette.

4. A manual gear shifter assembly as set forth in claim 1 wherein said solenoid includes a movable plunger that is extended and retracted and having one end extending through said aperture of said flange.

5. A manual gear shifter assembly as set forth in claim 2 including a sound absorbing member mounted to one of said blocker and said solenoid cassette to reduce a sound of contact between said blocker and said solenoid cassette.

6. A manual gear shifter assembly as set forth in claim 1 wherein said shift lever includes a shaft having a projection extending outwardly and cooperating with said blocker.

7. A manual gear shifter assembly as set forth in claim 2 wherein said solenoid cassette includes a wall facing a side of said blocker which is opposite a side of said blocker which engages said shift lever to abut said blocker if said shift lever is forcefully displaced towards said blocked position to reduce mechanical stress on said blocker.

8. A manual gear shifter assembly for use with a transmission of a vehicle, the transmission having a plurality of gears, said assembly comprising:
   a shifter housing;
   a shift lever pivotally mounted to said shifter housing with said shift lever displaceable in a select direction to move between at least a first shift gate and a second shift gate, and displaceable to move in at least a first shift direction and a second shift direction for shifting the gears of the transmission;
   a shift cable coupled to said shift lever and for coupling to the transmission for selectively shifting the gears;
   a blocker pivotally mounted in said shifter housing for pivotal movement between engaged and dis-engaged positions;
   a solenoid disposed in said shifter housing and cooperating with said blocker to pivot said blocker transverse to said displacement of said shift lever into said engaged position to physically block said displacement of said shift lever into a predetermined gear for inhibiting shifting of the transmission during a predetermined condition, and to pivot said blocker transverse to said displacement of said shift lever into said dis-engaged position spaced from said shift lever to physically allow said displacement of said shift lever into the one of said first and second shift directions for allowing shifting of the transmission into the predetermined gear in the absence of the predetermined condition; and
   a solenoid cassette disposed in said shifter housing and having a cavity to receive said solenoid and including a base and a plurality of walls extending upwardly from said base, wherein one of said walls facing a side of said blocker which is opposite a side of said blocker which engages said shift lever to abut said blocker if said shift lever is forcefully displaced towards said blocked position to reduce mechanical stress on said blocker.

9. A manual gear shifter assembly as set forth in claim 8 wherein said blocker has an arm portion pivotally connected to said base and cooperating with said solenoid.

10. A manual gear shifter assembly as set forth in claim 9 wherein said blocker has a blocking portion extending from said arm portion for cooperating with said shift lever.

11. A manual gear shifter assembly as set forth in claim 9 including a pivot pin pivotally connecting said arm portion to said solenoid cassette.

* * * * *